United States Patent [19]

Rose

[11] 4,273,903

[45] Jun. 16, 1981

[54] SULPHONATED POLYARYLETHERSULPHONE COPOLYMERS

[75] Inventor: John B. Rose, Letchworth, England

[73] Assignee: Imperial Chemical Industries Limited, England

[21] Appl. No.: 68,466

[22] Filed: Aug. 21, 1979

[30] Foreign Application Priority Data

Sep. 5, 1978 [GB] United Kingdom ............... 35589/78
Jan. 24, 1979 [GB] United Kingdom ............... 02490/79

[51] Int. Cl.$^3$ ....................... C08G 65/40; C08G 75/23
[52] U.S. Cl. .................................... 525/534; 528/174; 528/175; 210/500.2
[58] Field of Search ............... 528/174, 175; 525/534; 210/500 M

[56] References Cited

U.S. PATENT DOCUMENTS

| | | | |
|---|---|---|---|
| 3,663,509 | 5/1972 | Bonnard et al. | 528/174 |
| 3,709,841 | 1/1973 | Quentin | 528/174 |
| 3,875,096 | 4/1975 | Graefe et al. | 528/174 |
| 4,010,147 | 3/1977 | Rose | 528/174 |
| 4,054,707 | 10/1977 | Quentin | 528/174 |
| 4,105,635 | 8/1978 | Freeman | 528/174 |

OTHER PUBLICATIONS

Houben-Weyls, *Methoden der Organischen Chemie*, 4th Edition, vol. IX, 1955.
G. Thieme Verlag, *Stuttgart*, pp. 460-471.
W. Foerst, *Ullmanns Encyklopadie der Technischen Chemie*, 3rd Edition, vol. 14, 1963.
Urban and Schwarzenberg, Munchen, Berlin, pp. 595-597.

*Primary Examiner*—Lester L. Lee

[57] ABSTRACT

A polyarylethersulphone copolymer which is a hydrophilic sulphonated copolymer derived by controllably sulphonating a copolymer having the repeat unit of formula

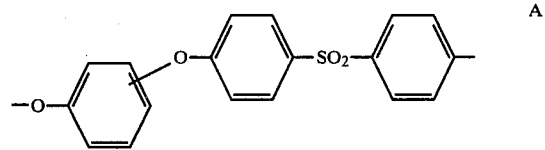

together with the repeat unit B of formula

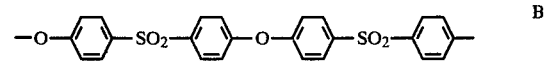

substantially all the units A being sulphonated after sulphonation and substantially all the units B remaining non-sulphonated after sulphonation. The sulphonation is effected using 98% w/w sulphuric acid.

6 Claims, No Drawings

SULPHONATED POLYARYLETHERSULPHONE COPOLYMERS

The present invention relates to certain sulphonated polyarylethersulphone copolymers.

We have found that polyarylethersulphone polymers containing only the repeat units of formula

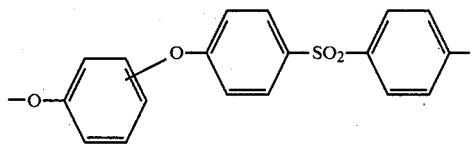

dissolve in concentrated sulphuric acid (98% w/w) and sulphonate very rapidly to give completely water-soluble products, probably due to the substitution of —SO$_2$OH groups in all or most of the aromatic rings in the subunits.

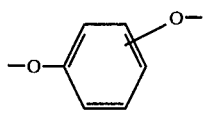

of the polymer (see Examples 7 to 9), monosulphonation occurring in the case of the polymers with ortho or para disposed ether linkages in the sub-units and disulphonation occurring in the polymers with meta disposed linkages in the sub-units.

By contrast we have found that the polyarylethersulphones containing only the repeat unit of formula

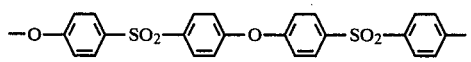 B are virtually non-susceptible to sulphonation in concentrated sulphuric acid (98% w/w), the sulphuric acid dissolving the polymer but not changing it, (see Example 10), even though other sulphonating agents such as oleum and chlorosulphonic acid, and even a mixture of concentrated sulphuric acid with a little oleum, completely sulphonate the polymer and/or degrade it (see Examples 11 and 12). Consequently polyarylethersulphone copolymers containing repeat units A and B may be controllably sulphonated in concentrated sulphuric acid (98% w/w) to give hydrophilic sulphonated copolymers (ranging up to completely water soluble polymers) by varying the proportion of the repeat unit B in the copolymer.

According to the present invention there is provided a polyarylethersulphone copolymer which is a hydrophilic sulphonated copolymer derived by controllably sulphonating a copolymer having the repeat unit of formula

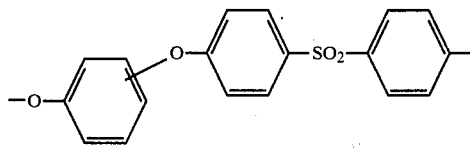 A together with repeat unit of formula

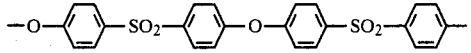

substantially all the units A being sulphonated after sulphonation and substantially all the units B remaining non-sulphonated after sulphonation.

The polyarylethersulphone copolymer of the invention is preferably one derived by sulphonating a copolymer which has 1 to 99 mole % of units A and 99 to 1 mole % of units B, and in particular a copolymer which has 5 to 80 mole % of units A and 95 to 20 mole % of units B.

The control of the sulphonation reaction should be such that the resulting copolymer preferably has a degree of hydrophilicity corresponding to a water absorption capacity at ambient temperature of about 2 weight % water absorption to complete solubility in water.

The hydrophilic polymers of the invention (which preferably absorb 2-40 weight % water, particularly 5-30 weight % water, at ambient temperature) are potentially useful as membrane materials, e.g. for ultra-filtration processes, e.g. desalination and removal of microorganisms, since they are not only hydrophilic in character but retain considerable strength even when containing a significant quantity of water (e.g. up to 20 weight % water) (see Example 5).

Ionomers of the above-defined copolymers which are sulphonated with —SO$_2$OH groups may be readily prepared e.g. by converting the —SO$_2$OH groups to salts such as SO$_3$—M$^+$ (where M=an alkali metal or NR$_4$, R being an alkyl group); these too have utility as hydrophilic polymers. Accordingly, the sulphonyl groups of the copolymers of the invention preferably have the formula SO$_2$OY where Y is H, an alkali metal, or NR$_4$ where R is an alkyl group.

Copolymers having the repeat units A and B may be conveniently prepared by condensation of the appropriate dihydroxy phenol (e.g. hydroquinone, catechol or resorcinol), 4,4'-dihydroxydiphenylsulphone and 4,4'-dichlorodiphenylsulphone, and an alkali metal carbonate or bicarbonate in the presence of a sulphone or sulphoxide solvent, using the method of preparing polyarylene polyethers described in Canadian Pat. No. 847 963.

The present invention is now illustrated by the following examples.

EXAMPLE 1

A copolymer (20 gms) of repeat units A (para disposed ether linkages in sub-units) and B containing 25 mole % of units A (and correspondingly 75 mole % of units B) was shaken for 18 hours with concentrated sulphuric acid (98% w/w) (110 ml) to give a very viscous solution. Further (50 ml) concentrated sulphuric acid was added and shaking continued for a further 18 hours (i.e. 36 hours in all).

This solution was then poured into distilled water (800 ml) in a Waring blender, to give a white precipitate which was filtered and washed 3 times with fresh water in the blender, being separated by filtration after each wash.

The product was dried overnight at about 65° C. in a vacuum oven.

Copolymers of repeat units A (para disposed ether linkages in sub-units) and B of different composition (varying from 25 mole % A to 66.7 mole % A and correspondingly 75 mole % B to 33.3 mole % B) were used in this Example. All the prepared products after analysis by 220 MHz nmr spectroscopy indicated monosulphonation on substantially all of the sub-repeat units

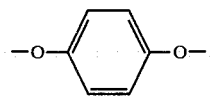

in the polymer chain but no sulphonation on any of the repeat units B. All the products were soluble in dimethyl formamide and dimethylsulphoxide.

EXAMPLE 2

A copolymer (5 g) of repeat units A (para disposed ether linkages in sub-units) and B containing 80 mole % A and 20 mole % B was shaken overnight with concentrated sulphuric acid (98% w/w) (20 ml). Further (20 ml) concentrated sulphuric acid was added and shaking continued for a further 24 hours. This solution was then poured into distilled water in a Waring blender to give a white precipitate which was filtered and washed 4 times with water, and dried overnight in a vacuum oven.

Copolymers of repeat units A (para disposed ether linkages in sub-units) and B containing respectively 5 mole % A/95 mole % B, 90 mole % A/10 mole % B, 40 mole % A/60 mole % B were sulphonated in a similar fashion to the copolymer 80 mole % A/20 mole % B, although starting from different quantities of copolymer and using different amounts of concentrated sulphuric acid.

The products were analysed by 220 MHz spectroscopy and indicated monosulphonation on substantially all of the sub-repeat units

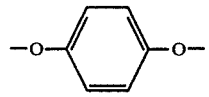

in the polymer chain but no sulphonation on any of the repeat units B.

EXAMPLE 3

The sodium salts of the sulphonated copolymers of Example 2 were prepared by neutralisation in excess NaOH solution. The neutralisation of the sulphonated 10 mole % A/90 mole % B copolymer is described as a typical example.

The sulphonated 10 mole % A/90 mole % B copolymer of Example 2 (50 g) was stirred overnight in a solution of NaOH (30 g) in water (600 ml). The mixture was then heated at 60°–80° C. all day and cooled to 40° C. The product was filtered, washed 4 times with water and oven dried.

The sodium contents of the sulphonated 10 mole % A/20 mole % B, 20 mole % A/80 mole % B and 40 mole % A/90 mole % B copolymers were determined using flame emission spectroscopy (FES) and confirmed the nmr spectroscopic analysis indicating that substantially all the units A had been monosulphonated. The results were as follows:

| Molar Ratio A/B in copolymer | Na content of sulphonated copolymer found by FES | Monosulphonation of units A requires |
| --- | --- | --- |
| 10/90 | 0.53% | 0.58% |
| 20/80 | 1.20% | 1.00% |
| 40/60 | 2.30% | 2.06% |

EXAMPLE 4

The water absorption of the copolymers of Example 2 before sulphonation and after sulphonation, and also of the neutralised sulphonated copolymers of Example 3, were measured after steeping initially dry films of the copolymers (cast from solution in dimethyl formamide) in water for 24 hours at ambient temperature. The results were as follows:

| Molar Ratio A/B in copolymer | Water absorption (weight %) of copolymer before sulphonation (Example 2) | Water absorption (weight %) of sulphonated copolymer (Example 2) | Water absorption of (weight %) of neutralised sulphonated copolymer (Example 3) |
| --- | --- | --- | --- |
| 5/95 | 2.4 | 4.5 | 2.4 |
| 10/90 | 2.5 | 4.4 | 3.6 |
| 20/80 | 2.3 | 4.5 | 5.5 |
| 40/60 | 3.9 | 8.9 | 13.1 |
| 80/20 | not measured | not measured | 36.6 |

EXAMPLE 5

The sulphonated 40 mole % A/60 mole % B and 80 mole % A/20 mole % B copolymers of Example 2 were tested in the form of cast film for mechanical properties, both dry and after absorption of moisture. For comparison purposes a homopolymer containing units B only (not sulphonated) was also tested. The results were as follows:

| Polymer Used | | Water Content (wt %) | 1% Secant Modulus (NMm$^{-2}$) | Yield Stress (NMm$^{-2}$) | Tensile Strength (NMm$^{-2}$) | Elongation at Break (%) |
| --- | --- | --- | --- | --- | --- | --- |
| Homopolymer of units B | Dry | — | 1450 | — | 74 | 8.2 |
| | Wet | 1.0 | 1350 | — | — | — |
| Sulphonated copolymer 40 mole % A/ 60 mole % B Sulphon- | Dry | — | 1700 | 68 | 62 | 10.1 |
| | Wet | 8.3 | 1500 | 45 | — | — |

| Polymer Used | Water Content (wt %) | 1% Secant Modulus (NMm$^{-2}$) | Yield Stress (NMm$^{-2}$) | Tensile Strength (NMm$^{-2}$) | Elongation at Break (%) |
| --- | --- | --- | --- | --- | --- |
| ated copolymer 80 mole % A/ | Dry | — | 1750 | 59 | 47 | 14.7 |
| 20 mole % B | Wet | 19.5 | 1030 | 32 | 26 | 32.1 |

(— indicates not measured)

EXAMPLE 6

A copolymer (5 g) of repeat units A (meta disposed ether linkages in sub-units) and B containing 40 mole % A and 60 mole % B was dissolved in concentrated sulphuric acid (98% w/w) and left for 36 hours. This solution was poured into distilled water to give a precipitate which was filtered, washed 3 times with water and oven dried. The product was analysed by 220 MHz spectroscopy and indicated disulphonation on substantially all of the subrepeat units

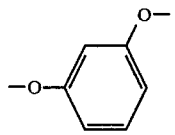

in the polymer chain but no sulphonation on any of the repeat units B.

The water absorption of the copolymer was measured after steeping an initially dry film of the copolymer (cast from solution in dimethyl formamide) in water for 24 hours at ambient temperature; the value obtained was 7.5 weight %.

EXAMPLE 7

A homopolymer of repeat unit A (para disposed ether linkages in sub-units) (10 g) was dissolved in concentrated sulphuric acid (98% w/w) with stirring and samples (50 ml) removed from time to time and precipitated in dilute sulphuric acid or saturated sodium sulphate; the polymer samples corresponding to the various times of sulphonation were analysed by 220 MHz nmr spectroscopy as solutions in dimethyl sulphoxide and found to have the following properties:

| | |
| --- | --- |
| 1 hour | 85% of the units bore an —SO$_2$OH group (isolated as Na salt). |
| 2 hours | 99% of the units bore an —SO$_2$OH group (isolated as Na salt). |
| 4.5 hours | 100% of the units bore an —SO$_2$OH group (isolated as Na salt). |
| 23 hours | 98% of the units bore an —SO$_2$OH group (isolated as free acid). |

Substantially all the sub-units bore one —SO$_2$OH group.

EXAMPLE 8

A homopolymer of repeat unit A (ortho disposed ether linkages in sub-units) was sulphonated in concentrated sulphuric acid (98% w/w) and the product analysed by 220 MHz nmr spectroscopy as a solution in the concentrated sulphuric acid (the product would not precipitate by pouring the acid solution into water). As with the homopolymer of repeat unit A (para disposed ether linkages in sub-units) the product was found to have sulphonated rapidly with substantially all the sub-units bearing one —SO$_2$OH group.

EXAMPLE 9

A homopolymer of repeat unit A (meta disposed ether linkages in sub-units) was sulphonated in concentrated sulphuric acid (98% w/w) and the product analysed by 220 MHz nmr spectroscopy as a solution in the concentrated sulphuric acid (the product would not precipitate by pouring the acid solution into water). As with the homopolymers of repeat unit A (para or ortho disposed ether linkages in the sub-units) the product was found to have sulphonated rapidly; substantially all the sub-units bore two —SO$_2$OH groups however.

EXAMPLE 10

A homopolymer containing the repeat unit B (50 g) was dissolved in concentrated sulphuric acid (98% w/w) (200 ml), left for 72 hours, precipitated in dilute sulphuric acid, washed, macerated and dried. The infrared and nmr spectra of the product showed it to be identical with the starting material.

EXAMPLE 11

A homopolymer containing the repeat unit B (20 g) was added to chlorosulphonic acid (100 ml). Slight effeverence was apparent and white fumes were evolved. After standing overnight (the total time of the polymer in the acid being 20 hours), the solution was poured into 300 ml of concentrated sulphuric acid (98% w/w) and this solution then poured onto ice. A very fine precipitate resulted, which filtered very slowly and was washed once with water and then dried. The product appeared to be almost entirely soluble in water—indicating a high degree of sulphonation.

EXAMPLE 12

A homopolymer of repeat unit B (20 g) was mixed with oleum (150 ml) and left overnight. The resulting black solution still contained undissolved polymer and so the mixture was stirred for a further 5 hours, and then poured into water. No precipitate was obtained, but instead a brownish/orange solution was obtained. The product was discarded, being assumed to be highly sulphonated or entirely degraded.

In another experiment, the homopolymer of repeat unit B (15 g) was dissolved in concentrated sulphuric acid (98% w/w); oleum (50 ml) was then added and the solution stirred for 30 minutes and then poured onto ice and left overnight. A rubbery white solid was precipitated and was washed and dried. This product was found to be highly sulphonated.

I claim:

1. A polyarylethersulphone copolymer which is a hydrophilic sulphonated copolymer having 1 to 99 mole % of repeat units based on the repeat unit which, with no sulphonation, has the formula

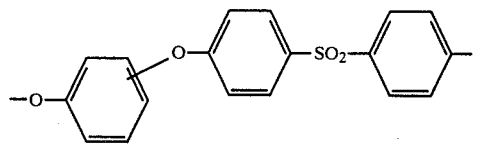   A wherein substantially all of said repeat units are sulphonated, the sulphonation present being in the sub-units

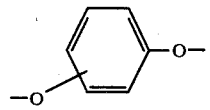

with monosulphonation thereof in the case of the ether linkages being ortho or para disposed and disulphonation thereof in the case of the ether linkages being meta disposed; and 99 to 1 mole % of substantially non-sulphonated repeat units of formula

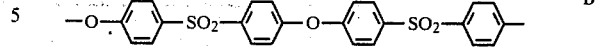   B

2. A polyarylethersulphone copolymer according to claim 1 which has 5 to 80 mole % of units A and 95 to 20 mole % of units B.

3. A polyarylethersulphone copolymer according to claim 1 having a hydrophilicity corresponding to water absorbtion capacity at ambient temperature of 2 weight % water absorption to complete solubility in water.

4. A polyarylethersulphone copolymer according to claim 3 having a hydrophilicity corresponding to a water absorption capacity at ambient temperature of 2 to 40 weight %.

5. A polyarylethersulphone copolymer according to claim 1 in which the sulphonyl groups on the copolymer have the formula —$SO_2OY$ where Y is H, an alkali metal or $NR_4$ where R is an alkyl group.

6. A polyarylethersulphone copolymer according to claim 1 in the form of a membrane.

* * * * *